US011002828B2

(12) United States Patent
Shan

(10) Patent No.: US 11,002,828 B2
(45) Date of Patent: May 11, 2021

(54) METHOD OF USING A MULTI-INPUT AND MULTI-OUTPUT ANTENNA (MIMO) ARRAY FOR HIGH-RESOLUTION RADAR IMAGING AND WIRELESS COMMUNICATION FOR ADVANCED DRIVER ASSISTANCE SYSTEMS (ADAS) AND AUTONOMOUS DRIVING

(71) Applicant: Tiejun Shan, Plano, TX (US)

(72) Inventor: Tiejun Shan, Plano, TX (US)

( * ) Notice: Subject to any disclaimer, the term of this patent is extended or adjusted under 35 U.S.C. 154(b) by 319 days.

(21) Appl. No.: 16/242,958

(22) Filed: Jan. 8, 2019

(65) Prior Publication Data
US 2019/0219666 A1 Jul. 18, 2019

Related U.S. Application Data

(60) Provisional application No. 62/616,844, filed on Jan. 12, 2018, provisional application No. 62/617,962, filed on Jan. 16, 2018, provisional application No. 62/617,723, filed on Jan. 16, 2018, provisional application No. 62/618,735, filed on Jan. 18, 2018, (Continued)

(51) Int. Cl.
*G01S 7/00* (2006.01)
*G01S 13/42* (2006.01)
*H01Q 21/06* (2006.01)
*H01Q 9/04* (2006.01)
*H04W 4/44* (2018.01)
*G01S 13/89* (2006.01)
*G01S 13/931* (2020.01)
*H01Q 1/32* (2006.01)
*H01Q 21/00* (2006.01)

(52) U.S. Cl.
CPC .............. *G01S 7/006* (2013.01); *G01S 13/42* (2013.01); *G01S 13/89* (2013.01); *G01S 13/931* (2013.01); *H01Q 1/3233* (2013.01); *H01Q 9/0414* (2013.01); *H01Q 21/0025* (2013.01); *H01Q 21/065* (2013.01); *H04W 4/44* (2018.02); *G01S 2013/9316* (2020.01)

(58) Field of Classification Search
CPC ........ G01S 13/726; G01S 13/48; G01S 13/42; H04W 4/40; H04W 4/44
See application file for complete search history.

(56) References Cited

U.S. PATENT DOCUMENTS

2009/0225909 A1* 9/2009 Bu .......................... G01S 19/36
375/343
2010/0290506 A1* 11/2010 Kerr ..................... H04B 1/7075
375/147

(Continued)

*Primary Examiner* — Erin F Heard
*Assistant Examiner* — Thomas M Hammond, III

(57) ABSTRACT

A method of using a multi-input multi-output (MIMO) antenna array for high-resolution radar imaging and wireless communication for advanced driver assistance systems (ADAS) utilizes a MIMO radar and at least one base station. The MIMO radar establishes wireless communication with the base station via an uplink signal. Likewise, the base station sends a downlink signal to the MIMO radar. Further, unlike conventional vehicle-to-everything (V2X) systems that filter the reflected uplink signal, the MIMO radar uses the reflected uplink signal to detect a plurality of targets. Accordingly, the MIMO radar derives spatial positioning data for each target from the reflected uplink signal.

6 Claims, 15 Drawing Sheets

Related U.S. Application Data provisional application No. 62/619,204, filed on Jan. 19, 2018, provisional application No. 62/628,436, filed on Feb. 9, 2018, provisional application No. 62/630,416, filed on Feb. 14, 2018, provisional application No. 62/754,448, filed on Nov. 1, 2018, provisional application No. 62/756,318, filed on Nov. 6, 2018.

(56) References Cited

U.S. PATENT DOCUMENTS

| | | | | |
|---|---|---|---|---|
| 2015/0296413 | A1* | 10/2015 | Sadek | H04B 1/1027 375/348 |
| 2016/0223643 | A1* | 8/2016 | Li | G01S 13/931 |
| 2017/0307729 | A1* | 10/2017 | Eshraghi | G01S 13/931 |
| 2017/0336495 | A1* | 11/2017 | Davis | G01S 13/931 |
| 2018/0077518 | A1* | 3/2018 | Nguyen | H04W 4/70 |
| 2019/0129003 | A1* | 5/2019 | Longman | G01S 13/42 |
| 2020/0280827 | A1* | 9/2020 | Fechtel | H04W 4/80 |
| 2020/0404684 | A1* | 12/2020 | Lee | H04W 4/40 |

* cited by examiner

METHOD OF USING A MULTI-INPUT AND MULTI-OUTPUT ANTENNA (MIMO) ARRAY FOR HIGH-RESOLUTION RADAR IMAGING AND WIRELESS COMMUNICATION FOR ADVANCED DRIVER ASSISTANCE SYSTEMS (ADAS) AND AUTONOMOUS DRIVING

The current application claims a priority to the U.S. Provisional Patent application Ser. No. 62/616,844 filed on Jan. 12, 2018.

FIELD OF THE INVENTION

The present invention generally relates to a method for a vehicle communication and radar sensing system. More specifically, the present invention is a method enabling a multi-input multi-output antenna array to perform as both a high-resolution radar imaging system and a mobile communication platform.

BACKGROUND OF THE INVENTION

Vehicle wireless communication network and auto radar for automatic driving vehicle have been fast-growing areas of interest for many automobile and wireless enterprises. These markets are among fastest growing markets in the world.

Recently, the development of automobile radar provides a sensing tool for advanced driver assistance systems (ADAS) and autonomous driving are the focus of automobile manufactures and the artificial intelligence (AI) research and development industry.

Vehicles communication network such as Vehicle-to-Everything (V2X) is a driving force for behind the 5G mobile standard, product developments, and applications. A V2X network connects vehicles with the surrounding communication nodes such as ground points, pedestrians, mobile or static base stations, and/or traffic infrastructure such as police stations, toll booth, traffic lights, etc.

However, automobile radar, vehicles wireless system for V2X are two completely independent systems in a vehicle that can induce interference and add the total cost. In particular, the reflected uplink signal uplink transmission counts as an interference noise to the downlink signal. To cancel the reflected uplink signal in the downlink signal would be beneficial to increase data rate and improve signal to noise ratio. Therefore, the present invention provides a method of combining a V2X transmitter and an auto radar into a single system that reduces the V2X system cost and provides both V2X networking abilities and high-resolution radar imaging for automatic driving.

DETAILED DESCRIPTION OF THE INVENTION

All illustrations of the drawings are for the purpose of describing selected versions of the present invention and are not intended to limit the scope of the present invention.

The present invention is a method of using a multi-input and multi-output (MIMO) antenna array for high-resolution radar imaging and wireless communication for driver assistance systems and autonomous driving. More specifically, the method of the present invention enables an automotive radar to detect moving and static objects while wirelessly communicating with at least one base station. In the preferred implementation, the MIMO radar and the at least one base station enables a vehicle-to-everything (V2X) network, whereby a vehicle communicates with other vehicles, static infrastructure, mobile infrastructure, and/or communication nodes through wireless local area networks (WLAN) or cellular networks.

Figure 1:
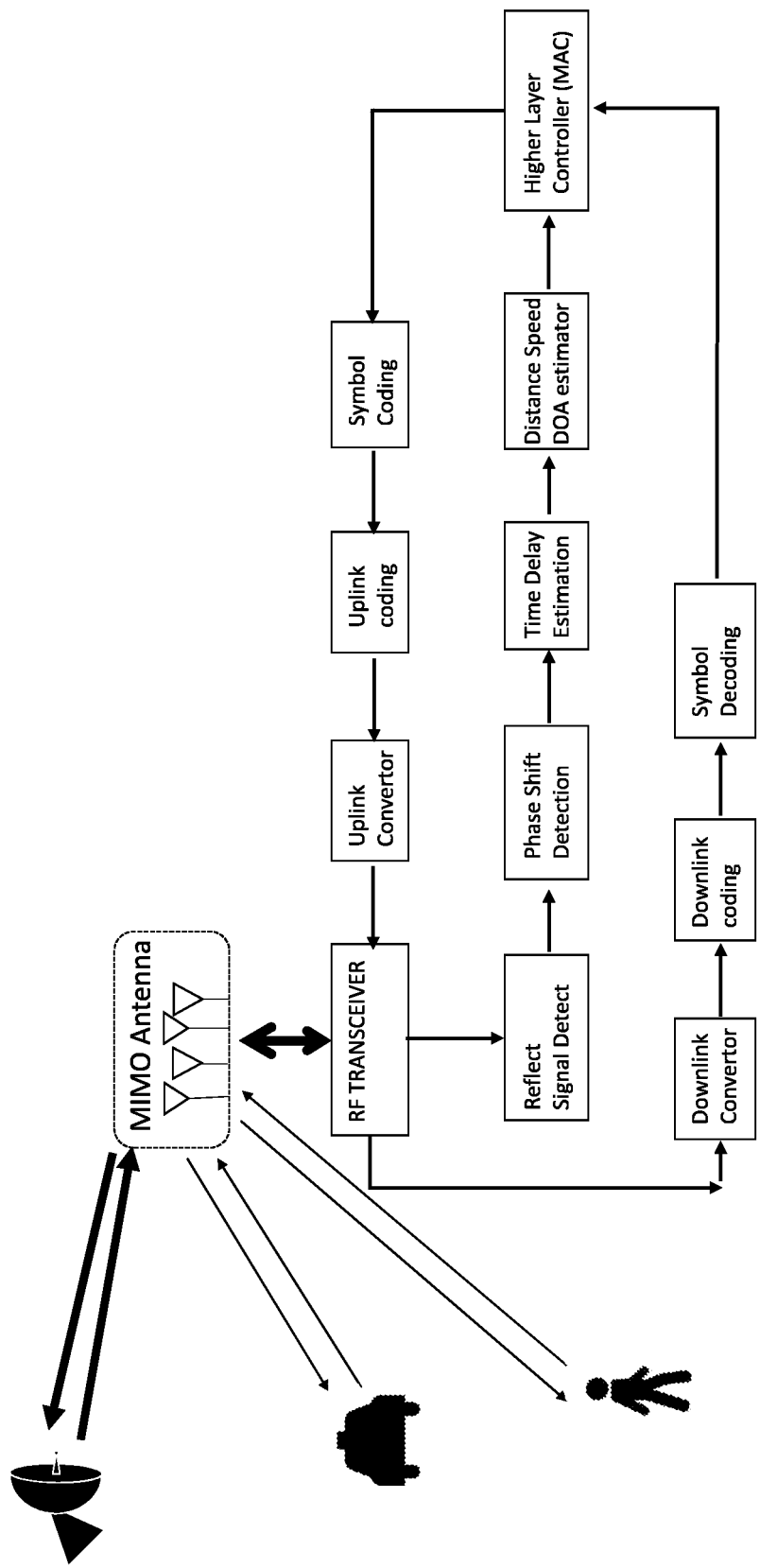
FIG. 1 is a schematic diagram of the system of the present invention.
Figure 2:
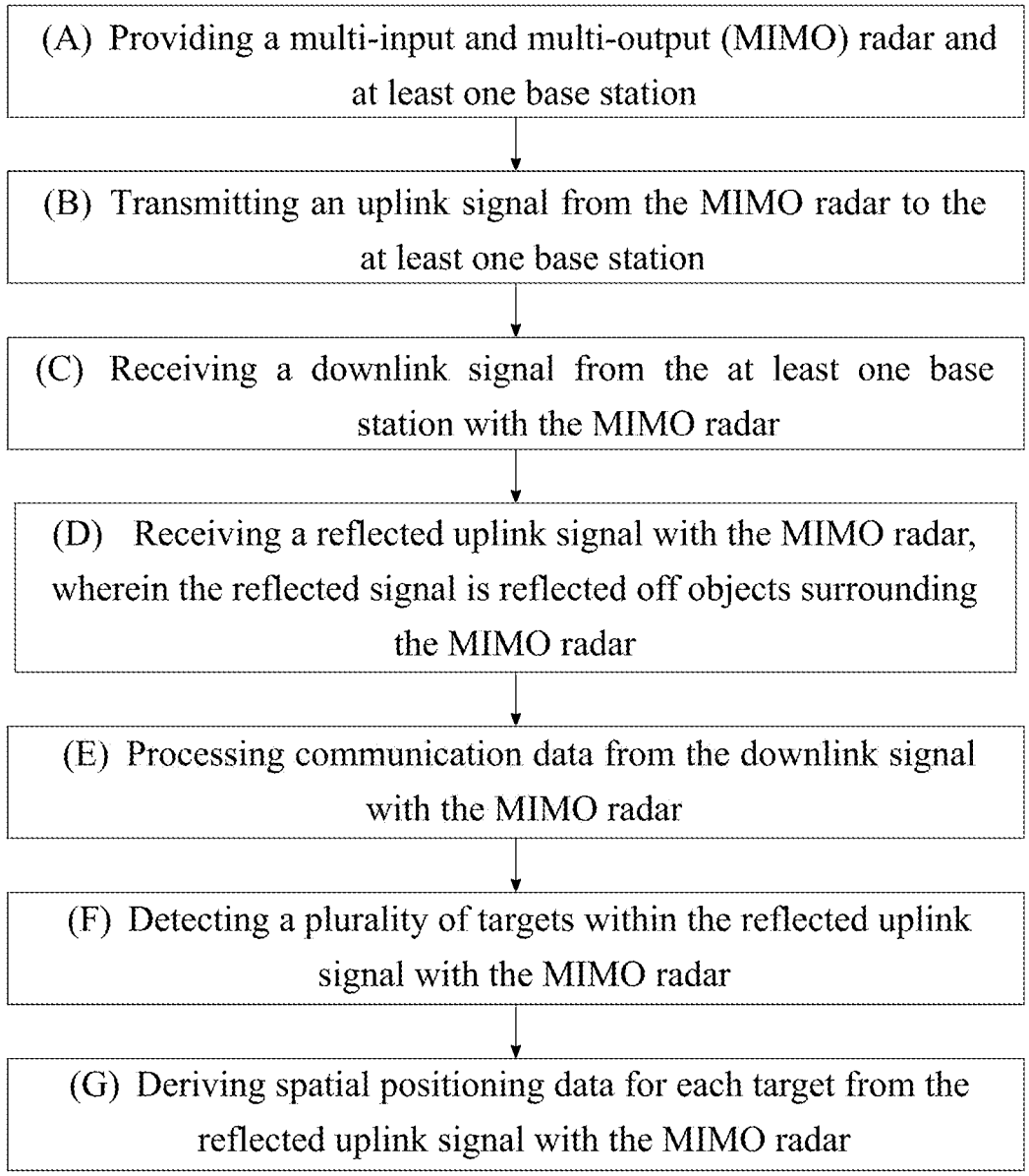
FIG. 2 is a flowchart of the overall process for the method of the present invention.

As can be seen in FIG. 1 and FIG. 2, the preferred embodiment of the present invention, a multi-input and multi-output (MIMO) radar and at least one base station is provided (Step A). The preferred MIMO radar is an advanced type of phased array radar comprising a plurality of antenna arrays, each of which can be independently directed. Likewise, the base station is a fixed or mobile communication platform that relays information to and from the MIMO radar. Accordingly, the MIMO radar transmits an uplink signal from the base station (Step B). In the preferred embodiment, the transmitted uplink signal reflected off objects, such as echoes from cars, pedestrians on the road, and other vehicles is processed to estimate distance, speed, and direction of arrive estimates. To the contrary, conventional V2X systems filter the reflected signals as channel noise.

Consequently, the MIMO radar receives a downlink signal from the base station (Step C). Preferably, the downlink signal is separated from the reflected uplink signal by filter techniques such as match filter, band pass filter, and digital filter bank. The downlink signal allows the base station to transmit information to the MIMO radar, thereby establishing wireless communication with the MIMO radar. In the preferred embodiment, the downlink signal adheres to 5G mobile standard enabling high speed communication between the MIMO radar and the base station. Alternately, the downlink signal may be encoded using other communication standards known in the relevant arts. Subsequently, the MIMO radar receives a reflected uplink signal, wherein the reflected signal is reflected off objects surrounding the MIMO radar (Step D). More specifically, the reflected uplink signal refers to echoes of the uplink signal reflected by objects in the scan range and beam direction. The reflected uplink signal is reflected by objects, such as echoes from cars, pedestrians, and buildings on the road where the vehicle is driving. Similarly, the MIMO radar processes communication data from the downlink signal (Step E). This establishes wireless communication between the MIMO radar and the base station, as may be required to transmit information to the vehicle. For example, the base station may transmit data to the vehicle's infotainment system for displaying maps, playing music or video, or allowing communication with other vehicles. Further, the base station may transmit over-the-air (OTA) updates for the infotainment operating systems and the like.

Unlike the reflected uplink signal, the downlink signal is generated by the base station and thus may have signal characteristics that are completely different from the uplink signal. In one embodiment, the downlink signal is filtered out of the reflected uplink signal using a downlink decoder. Once the downlink signal is filtered the reflected uplink signal is processes. As such, the MIMO radar detects a plurality of targets within the reflected uplink signal (Step F). More specifically, the signal characteristics of the reflected uplink signal changes when reflected off of an object in the vicinity of the vehicle. For instance, the reflected uplink signal may be phase shifted from the uplink signal. Based on the modified signal characteristics of the reflected uplink signal, the MIMO radar designates each object as a target. Accordingly, the plurality of targets may be objects surrounding the MIMO radar. Finally, the MIMO radar derives spatial positioning data for each target from the reflected uplink signal (Step G). More specifically, the MIMO radar estimates the time delay of the reflected uplink signal from the transmitted time of the uplink signal to get distance, speed, and the direction of arrive of the plurality of targets. Further, in one possible embodiment, the MIMO radar spatially separates the plurality of targets by beamforming uni-directional uplink signals towards each target.

Figure 3:
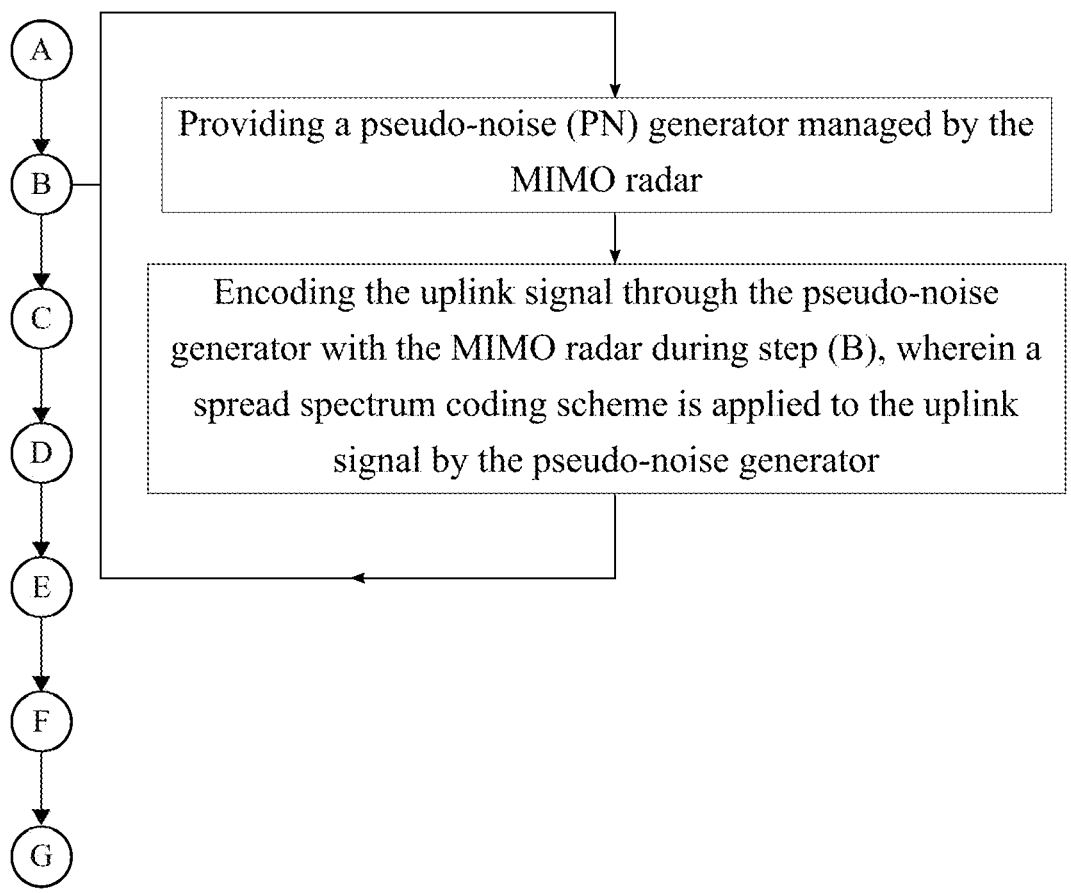
FIG. 3 is a flowchart of a subprocess for encoding the uplink signal with a spread spectrum coding scheme.

Referring to FIG. 3, in the preferred embodiment, the uplink signal is encrypted to reduce natural interference, noise, and jamming. Accordingly, the pseudo-noise (PN) generator managed by the MIMO radar is provided. The PN generator transforms the uplink signal into a signal similar to noise which satisfies one or more of the standard tests for statistical randomness. As such, the uplink signal is encoded through the PN generator with the MIMO radar during Step B, wherein a spread spectrum coding scheme is applied to the uplink signal by the PN generator. The spread spectrum coding scheme is introduced to increase signal-to-noise ratio (SNR) and to improve radar detection accuracy and range. The spread spectrum coding scheme spreads the bandwidth of the uplink signal during transmission. Using the spread spectrum coding scheme, the PN generator spreads the bandwidth of the uplink signal, thus increasing the resolution and reducing noise in the reflected uplink signal.

Figure 4:
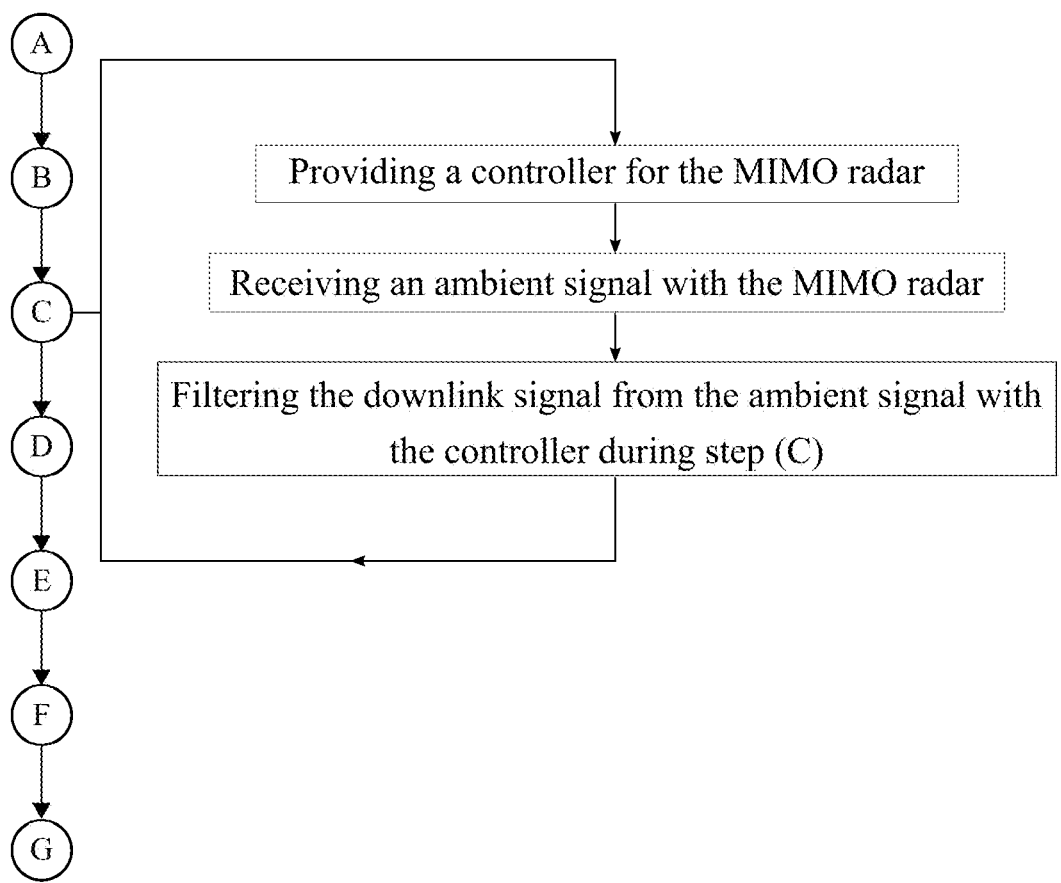
FIG. 4 is a flowchart of a subprocess for filtering the downlink signal from the ambient signal.
Figure 5:
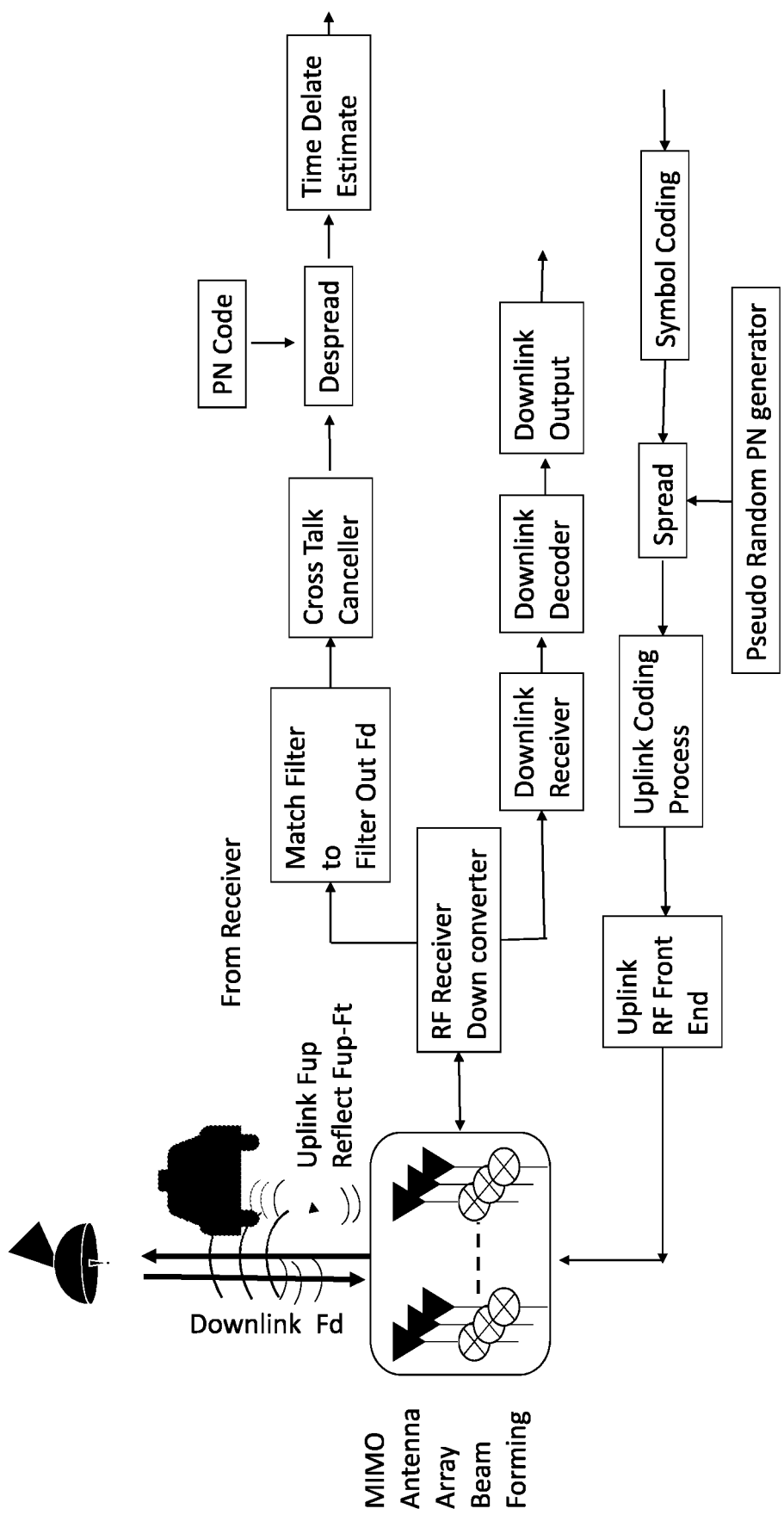
FIG. 5 is a schematic diagram depicting encoding the uplink signal with a spread spectrum coding scheme.
Figure 6:
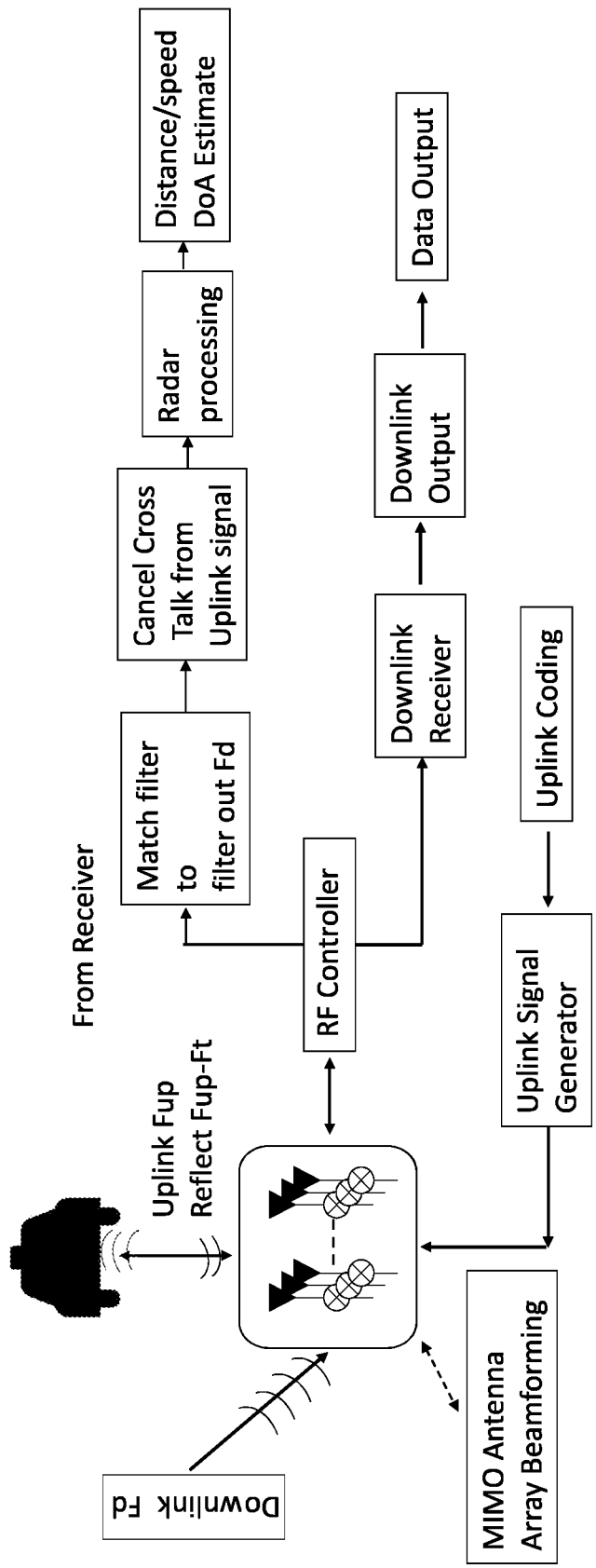
FIG. 6 is a schematic diagram depicting the RF controller separating the reflected uplink signal and the downlink signal from the ambient signal.

Referring to FIG. 4-FIG. 6, the preferred embodiment of the MIMO radar is also provided with a radio frequency (RF) controller. The RF controller comprises one or more microcontrollers dedicated for signal processing activities. As such, in the preferred embodiment, the RF controller may include the PN generator responsible for encoding the uplink signal with the spread spectrum coding scheme. Alternately, the RF controller may be separate from the PN generator and may instead only communicate with the PN generator. Subsequently, the MIMO radar receives an ambient signal. The ambient signal includes the reflected uplink signal, the downlink signal, and any other stray signals surrounding the vehicle. Accordingly, the RF controller filters the downlink signal from the ambient signal during Step C. Preferably, the downlink signal is separated from the ambient signal by filter techniques including, but not limited to, match filter, band pass filter, digital filter bank even in the collinear case where the base station and radar target are located colinearly. Once filtered, the downlink signal can be converted into a data output which is interpreted by the vehicle's onboard computers. The data output includes, but is not limited to, OTA updates, audio/video files, and/or communication data.

Subsequently, the MIMO radar detects and processes the reflected uplink signal. Accordingly, a plurality of transmitters, a plurality of receivers, and a RF controller for the MIMO radar is provided. The plurality of transmitters and the plurality of receivers are arranged into an array and are capable of transmitting directional signals, as well as directional scanning. Further, a PN-code regulator managed by the MIMO radar is provided, wherein the reflected uplink signal is encoded with the spread spectrum coding scheme. This spreads the bandwidth of the uplink signal and makes the uplink signal more resistant to jamming and noise. Given that the uplink signal is encoded with the spread spectrum coding scheme, the PN-code regulator must despread the reflected uplink signal. Accordingly, the MIMO radar receives the ambient signal. The ambient signal includes the reflected uplink signal, the downlink signal, as well as stray signals from surrounding signal sources. The PN-code regulator keeps track of the spread of the reflected uplink signal and filters out all unrelated signal in the ambient signal.

Figure 7:
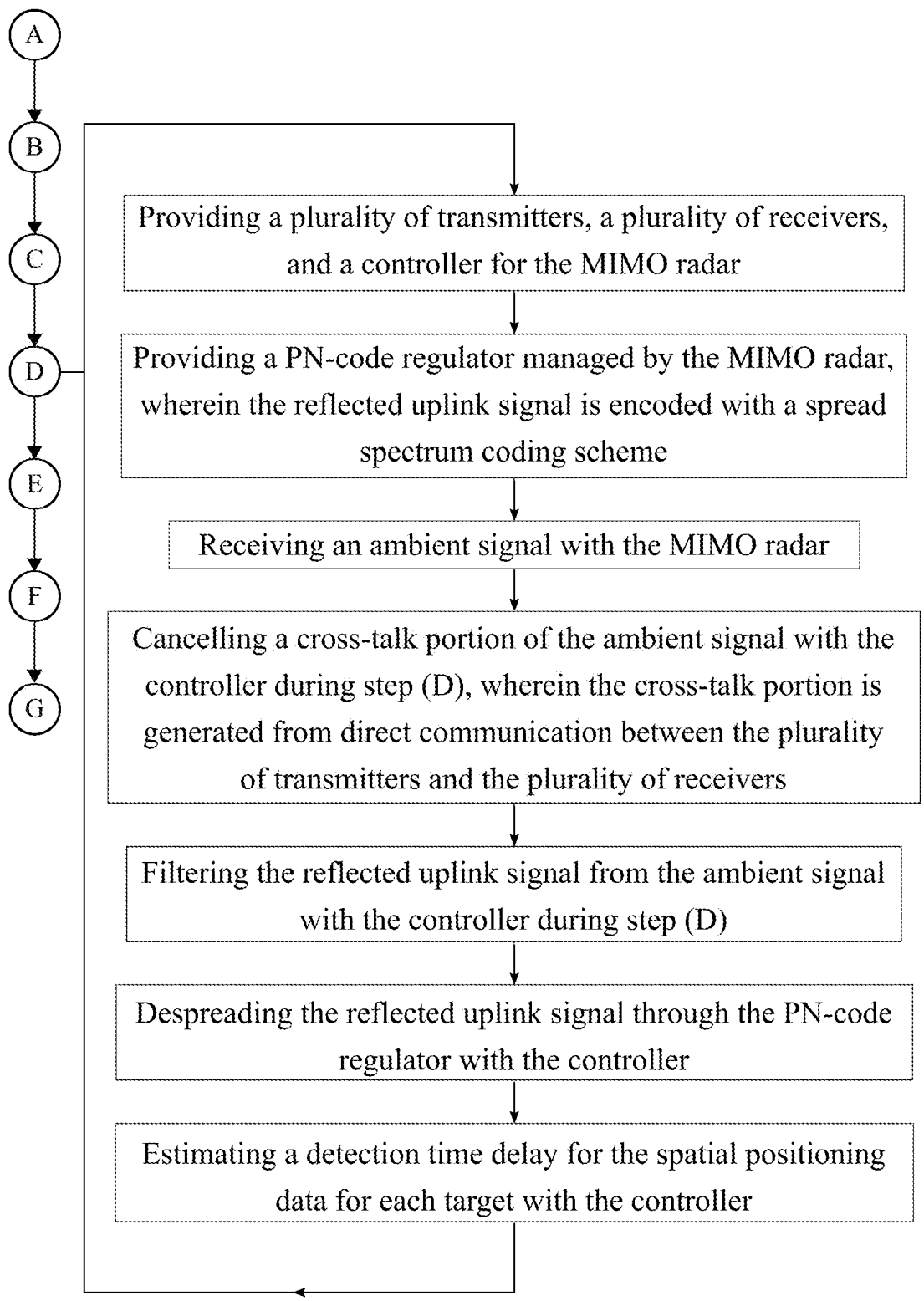
FIG. 7 is a flowchart of a subprocess for canceling a cross-talk portion of the ambient signal and despreading the reflected uplink signal to estimate a time delay for the spatial positioning data.
Figure 8:
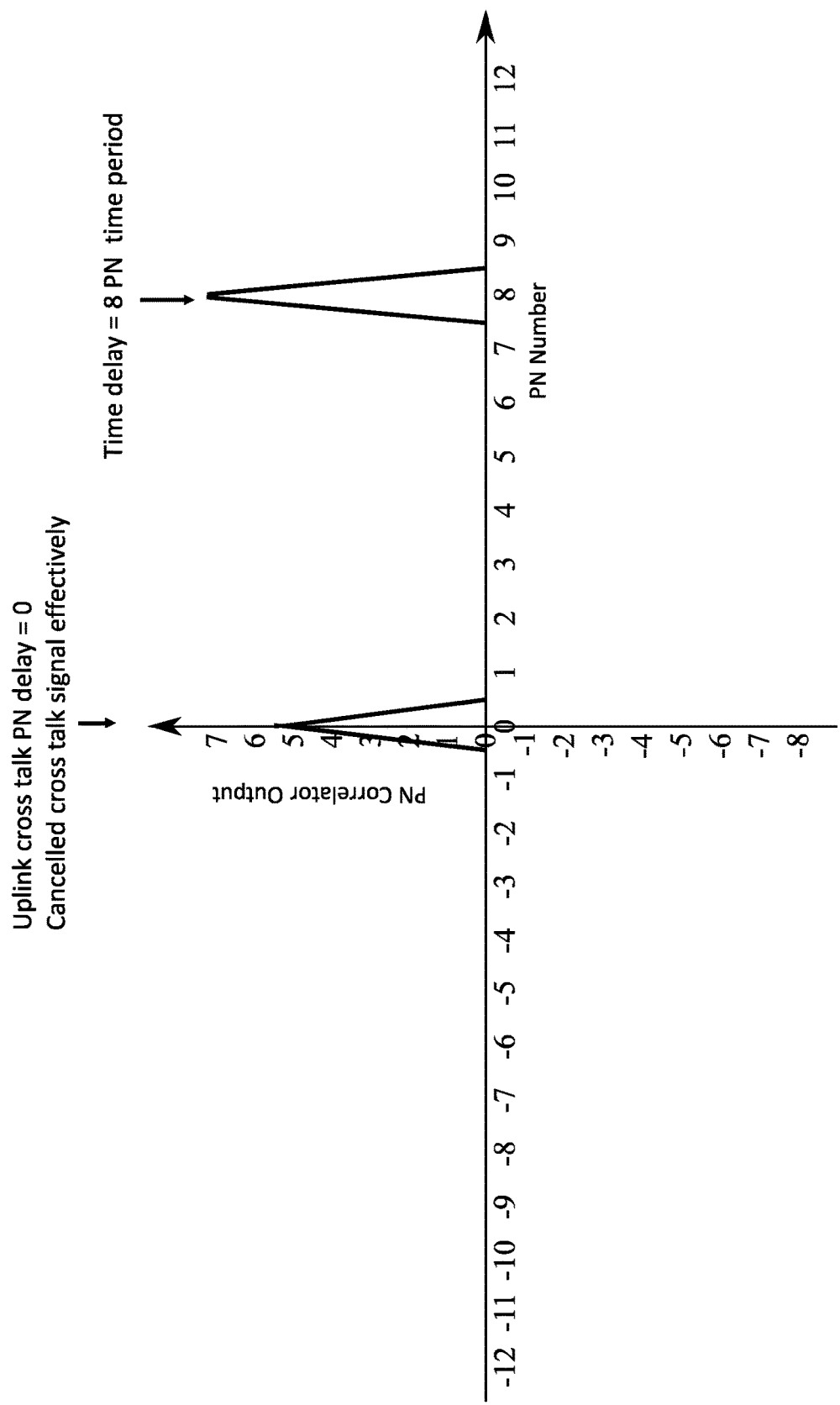
FIG. 8 is a graph depicting the cross talk due to the leak signal from the transmitter being in the same band as the echo from the target.

Referring to FIG. 7 and FIG. 8, the RF controller also cancels the cross-talk portion of the signal. In the preferred embodiment, each transmitter is positioned adjacent to a receiver from the plurality of receivers. This causes the uplink signal to leak from the transmitter to the receiver. To prevent this, the RF controller cancels a cross-talk portion of the ambient signal with the RF controller during Step D, wherein the cross-talk portion is generated from direct communication between the plurality of transmitters and the plurality of receivers. In the preferred embodiment, the cross-talk signal has a near-zero time delay owing to the close proximity of the transmitter to the receiver. In contrast, the reflected uplink signal typically has a time delay that is several times that of the cross-talk signal. As such, the RF controller is programmed to ignore signals having a time delay significantly lower than that of the reflected uplink signal. The RF controller filters the reflected uplink signal from the ambient signal with during Step D. Subsequently, the RF controller despreads the reflected uplink signal through the PN-code regulator. The PN-code regulator despreads the ambient signal and separates the reflected uplink signal to provide time delay estimate of the plurality of targets. Finally, the RF controller estimates a detection time delay for the spatial positioning data for each target. Time delay refers to the time between the transmission of the uplink signal and the detection of the reflected uplink signal. By calculating the time delay of the reflected uplink signal as well as other wave characteristics such as phase shift, amplitude envelopes, and frequency shift, the RF controller can determine precise locations for each of the plurality of targets.

Figure 9:
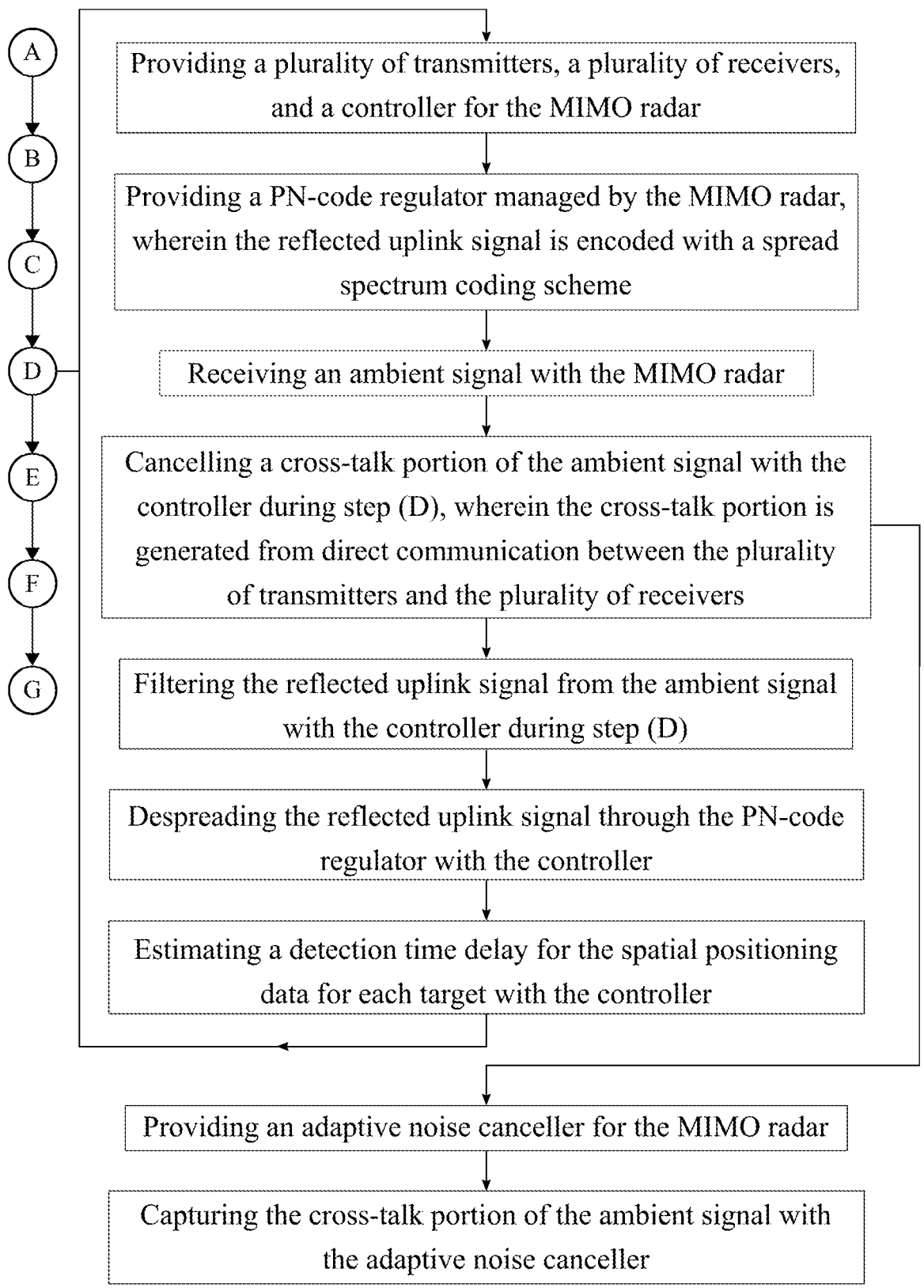
FIG. 9 is a flowchart of a subprocess for using an adaptive noise canceller for the MIMO radar.
Figure 10:
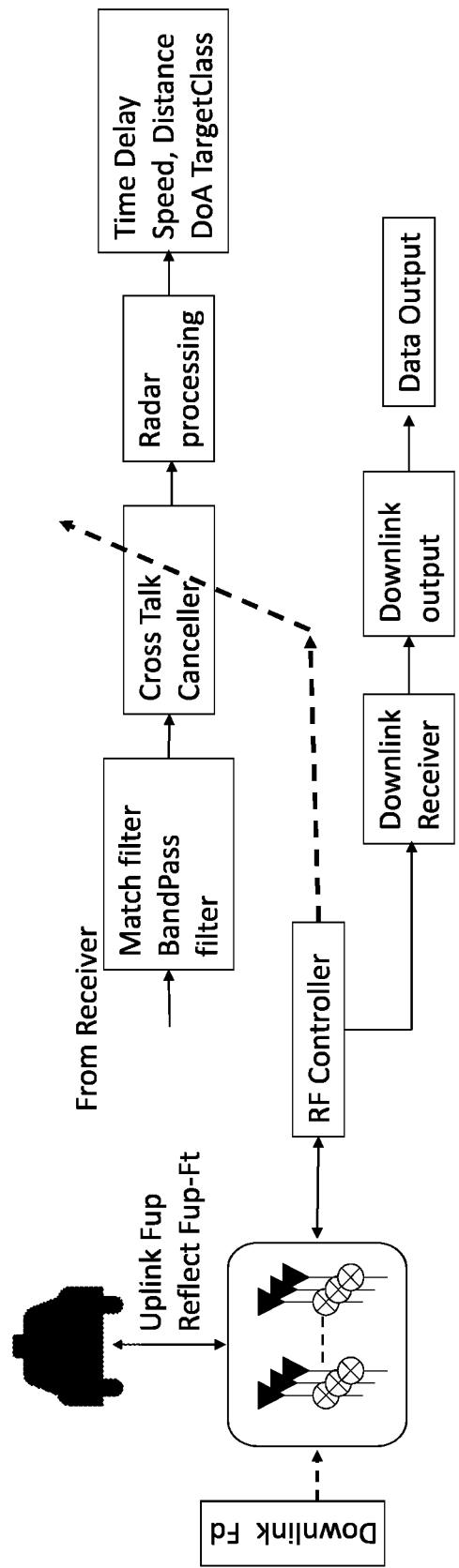
FIG. 10 is a schematic diagram depicting the adaptive noise canceller using the characteristics of the leak signal to cancel cross-talk between the transmitter and the receiver.
Figure 11:
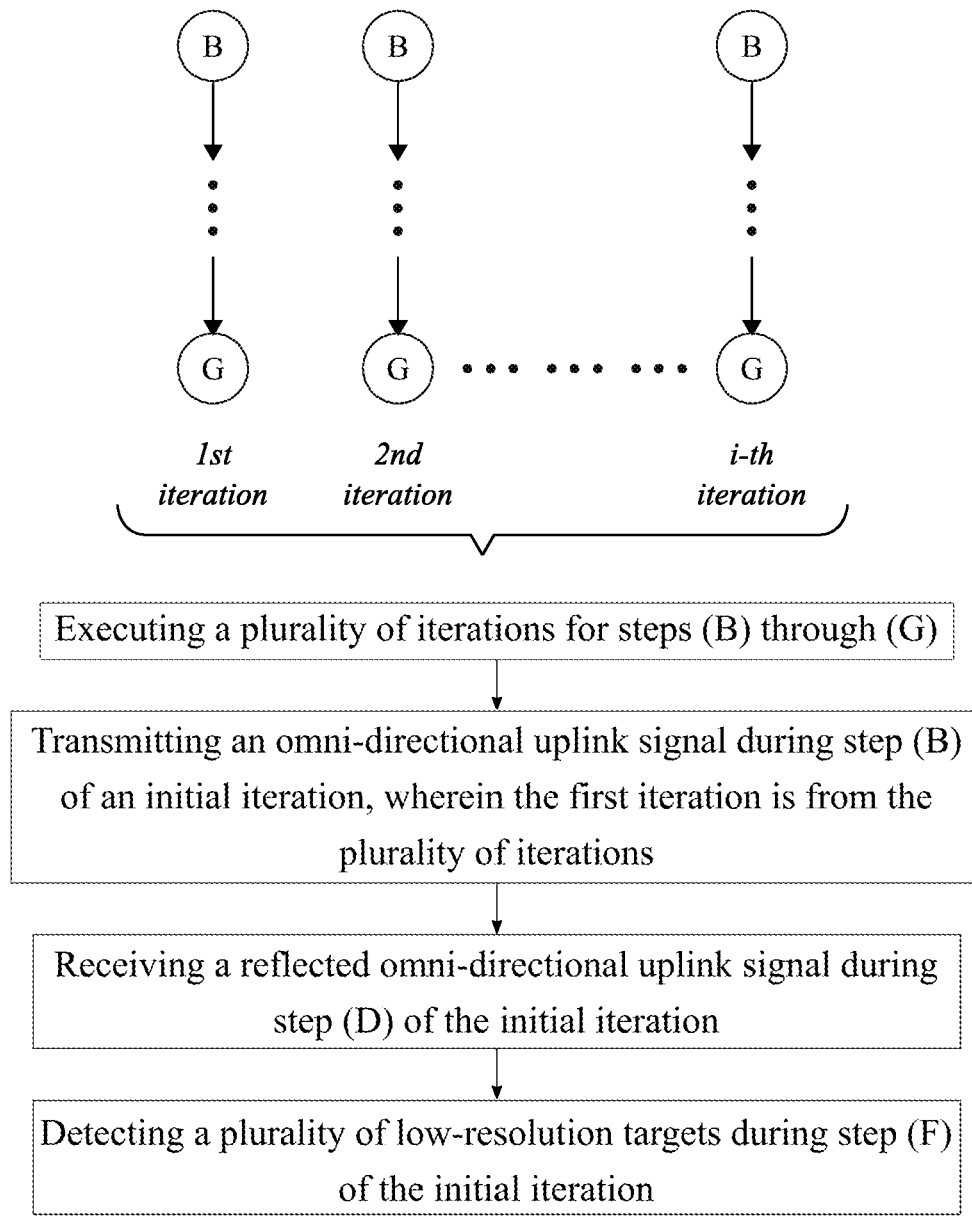
FIG. 11 is a flowchart of a subprocess for iterating Step B through Step G and transmitting an omni-directional uplink signal to detect a plurality of targets.
Figure 12:
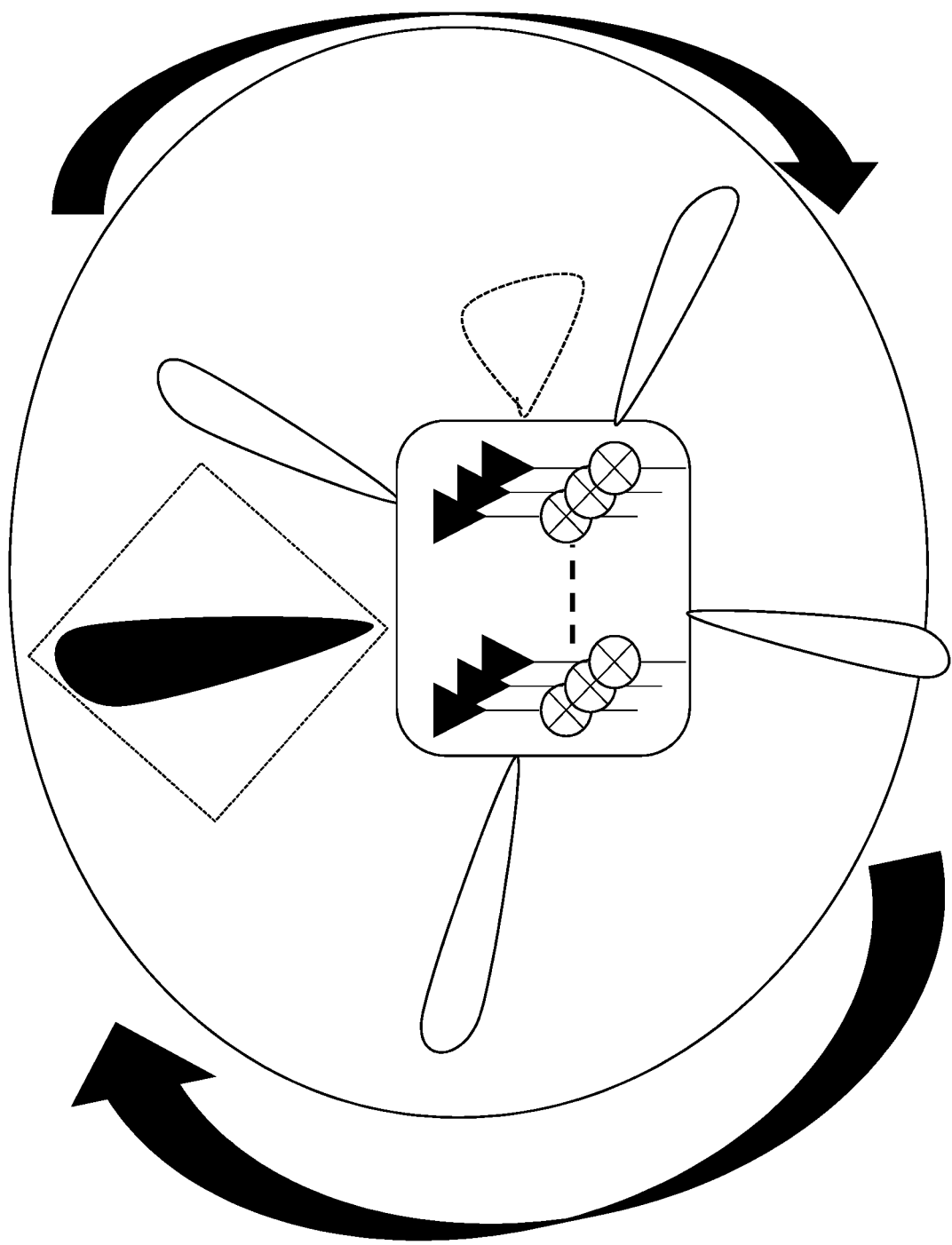
FIG. 12 is a diagram of the MIMO radar beamforming uni-directional signals towards the plurality of targets.

Referring to FIG. 9 and FIG. 10, further, an adaptive noise canceller for the MIMO radar is provided. The adaptive noise canceller minimizes the leak signal. As such, the adaptive noise canceller captures the cross-talk portion of the ambient signal. Referring to FIG. 11 and FIG. 12, in the preferred implementation of the present invention, the MIMO radar can operate in an omni-transmission mode or a uni-transmission mode using beamforming. Accordingly, a plurality of iterations for Steps B through G is executed. An omni-directional uplink signal is transmitted during step B of an initial iteration, wherein the initial iteration is from the plurality of iterations. More specifically, the plurality of transmitters transmits the omni-directional uplink signal in unison. The initial iteration is used to obtain the general position of the plurality of targets, and subsequent iterations are used to obtain high-resolution data of the plurality of targets. The omni-directional uplink signal hits the plurality of targets and is reflected back towards the MIMO radar. As such, a reflected omni-directional uplink signal is received during step D of the initial iteration. As mentioned, the omni-directional uplink signal is encoded with a spread spectrum coding scheme to filter the reflected uplink signal from the ambient signal. Further, for each target, the MIMO radar may assign a specific band, thereby filtering signals coming from the other targets. Accordingly, a plurality of low-resolution targets is detected during step F of the initial iteration. Each of the plurality of low-resolution targets provides the general location of one or more obstacles in the vehicle's periphery. Consequently, the MIMO radar generates a plurality of high-resolution targets by beaming directional signals towards each low-resolution target in subsequent iterations.

Figure 13:
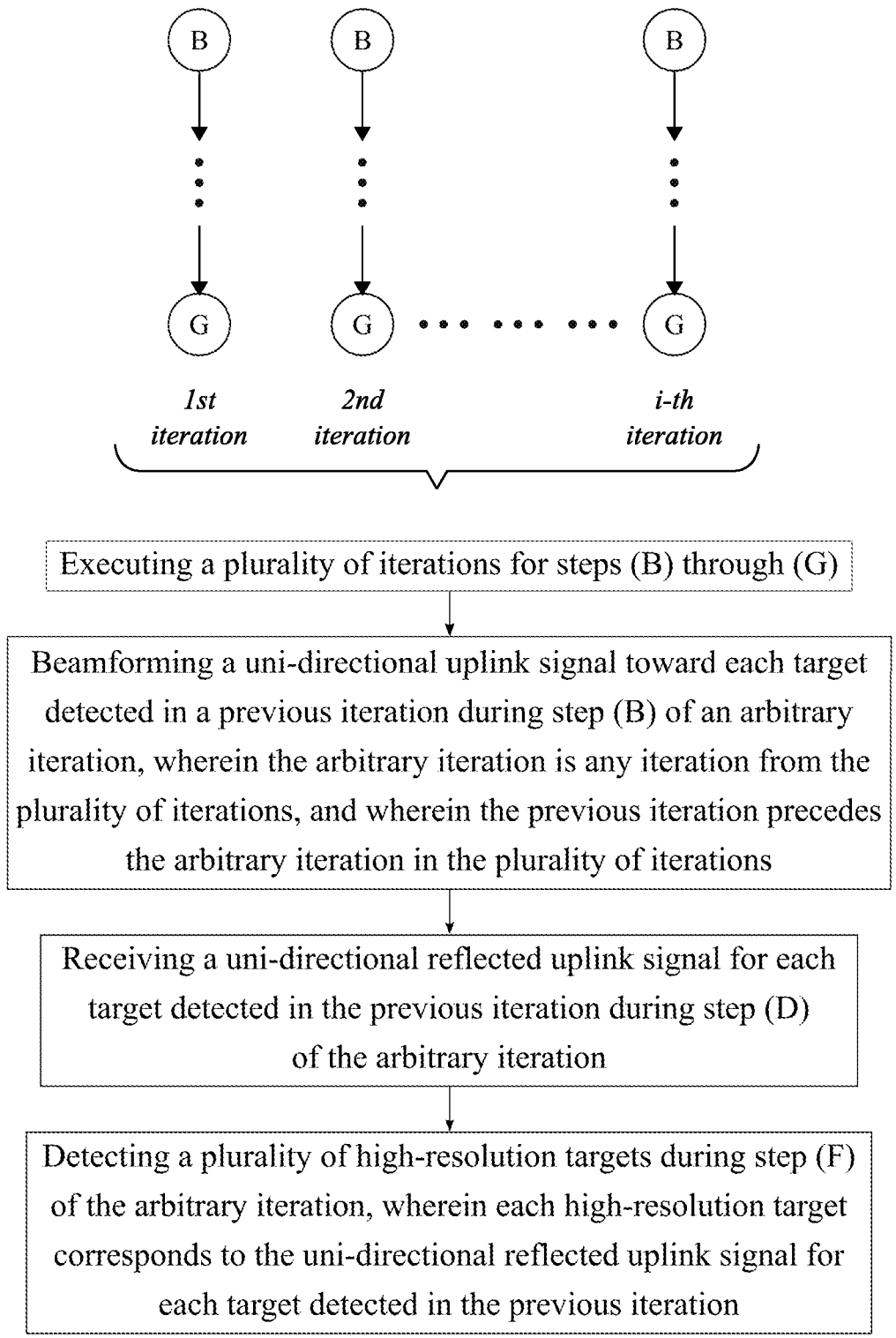
FIG. 13 is a flowchart of a subprocess for iterating Step B through Step G and transmitting an uni-directional uplink signal to detect a plurality of high-resolution targets.
Figure 14:
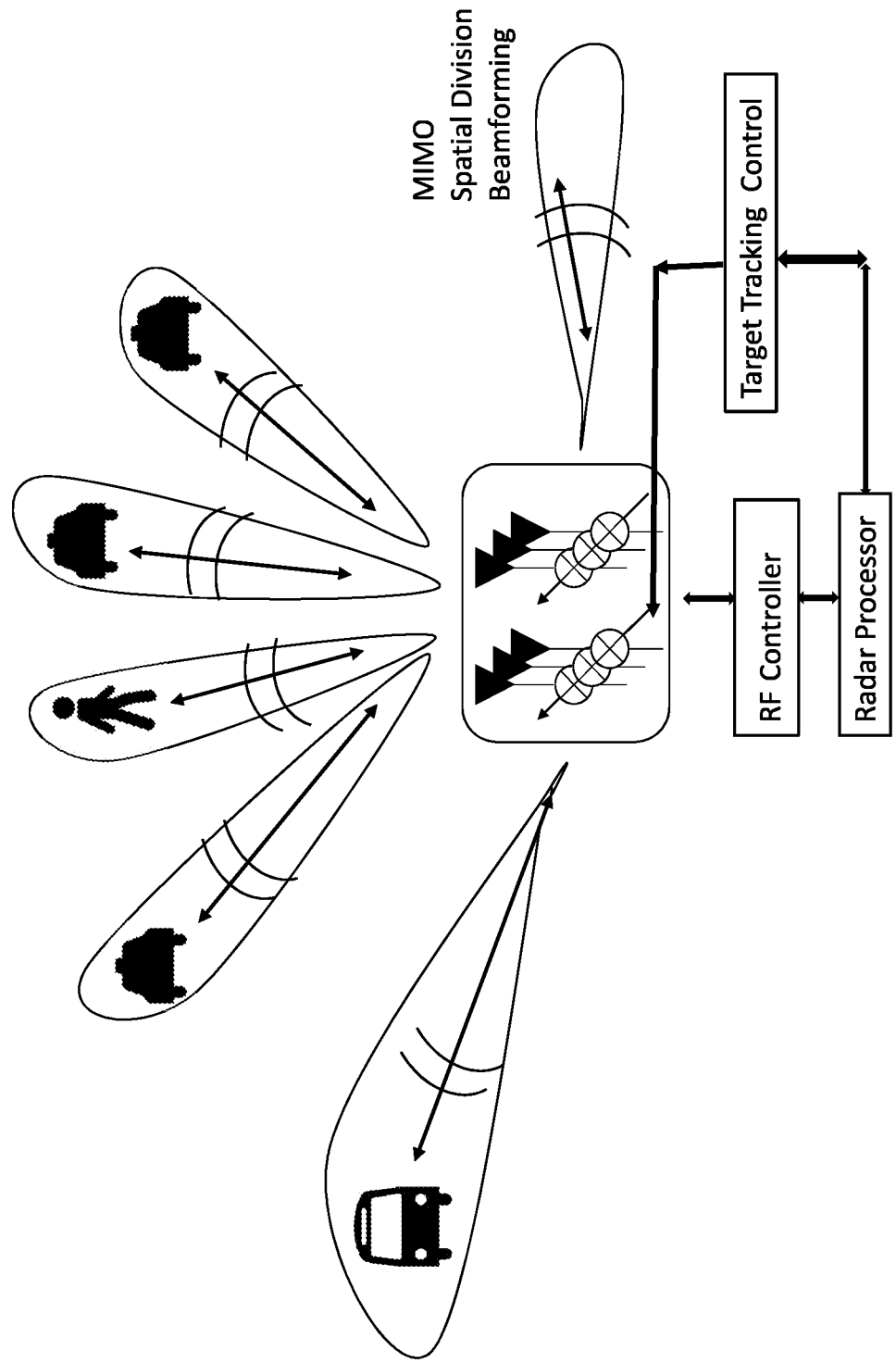
FIG. 14 is a schematic diagram depicting the MIMO radar using spatial division of the uplink signal to track the plurality of targets and communicate wirelessly with the base station.
Figure 15:
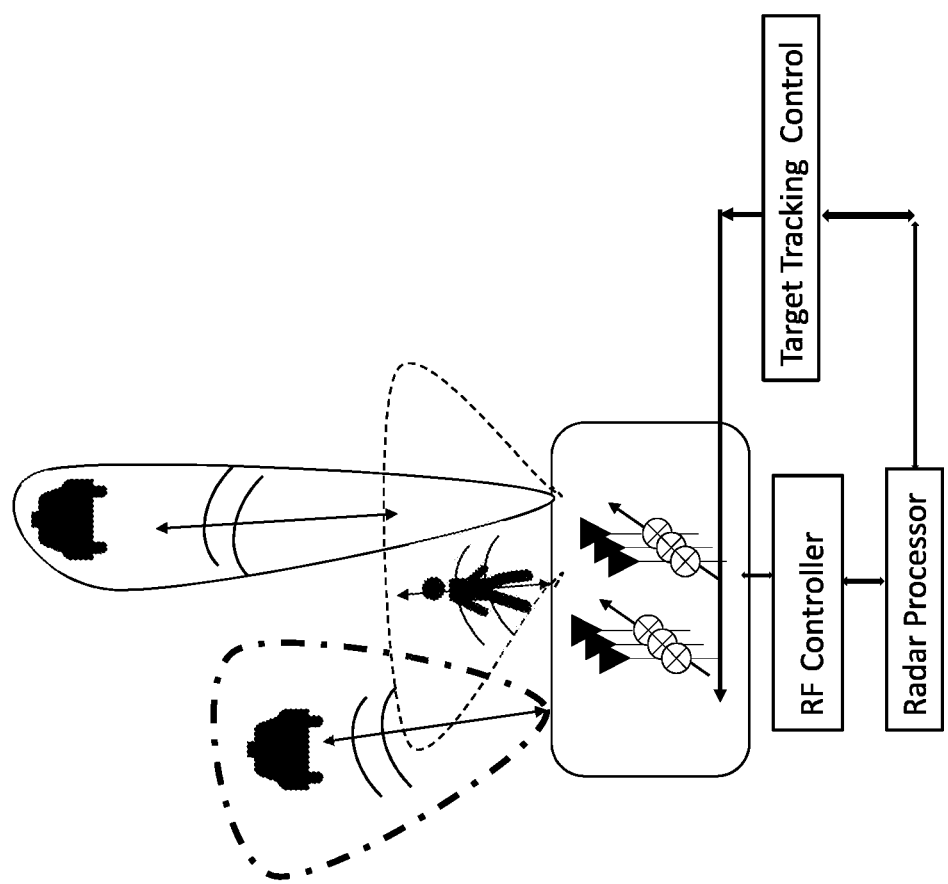
FIG. 15 is a schematic diagram depicting the separation of the reflected uplink signal from the downlink signal by filter techniques.

Referring to FIG. 13-FIG. 15, accordingly, a plurality of iterations for steps B through G is executed. As such, a uni-directional uplink signal is beamformed towards each target detected in a previous iteration during step B of an arbitrary iteration, wherein the arbitrary iteration is any iteration from the plurality of iterations, and wherein the previous iteration precedes the arbitrary iteration in the plurality of iterations. In the preferred embodiment, the plurality of iterations includes the initial iteration, the preceding iteration, and the arbitrary iteration. Thus, the MIMO radar consists of a plurality of antenna arrays that can each beamform a uni-directional uplink signal towards a target. Beamforming is made possible by transmitting in-phase signals through each antenna in the antenna array which allows the transmittance of the high-energy uni-directional uplink signal towards each target.

Each of the plurality of antenna array for the MIMO radar is capable of transmitting and scanning simultaneously. As such, each antenna array is capable of scanning the general direction of the target and receiving one or more uni-directional reflected signals. Accordingly, a uni-directional reflected uplink signal is received for each target detected in the previous iteration during step D of the arbitrary iteration. The uni-directional uplink signal allows for high-resolution radar imaging for each target. Subsequently, a plurality of high-resolution targets is detected during step F of the arbitrary iteration, wherein each high-resolution target corresponds to the uni-directional reflected uplink signal for each target detected in the previous iteration. The uni-directional reflected uplink signal is reflected with sufficient energy to detect the fine-grained details of the target. This can be used to separate several discrete high-resolution targets from an amorphous target or to aid in more accurate identification of the high-resolution target. In a possible scenario, the base station and the target may be located collinearly and thus may be detected as part of a target. In this case, the MIMO radar can separate the base station from the object while still wirelessly communicating with the base station.

Although the invention has been explained in relation to its preferred embodiment, it is to be understood that many other possible modifications and variations can be made without departing from the spirit and scope of the invention as hereinafter claimed.

What is claimed is:

1. A method of using a multi-input and multi-output (MIMO) antenna array for radar imaging and wireless communication for advanced driver assistance systems (ADAS) and autonomous driving, the method comprises the steps of:
    (A) providing a multi-input and multi-output (MIMO) radar and at least one base station;
    (B) transmitting an uplink signal from the MIMO radar to the at least one base station;
    (C) receiving a downlink signal from the at least one base station with the MIMO radar;
    (D) receiving a reflected uplink signal with the MIMO radar, wherein the reflected signal is reflected off objects surrounding the MIMO radar;
    providing a plurality of transmitters, a plurality of receivers, and a RF controller for the MIMO radar;
    providing a PN-code regulator managed by the MIMO radar, wherein the reflected uplink signal is encoded with a spread spectrum coding scheme;
    receiving an ambient signal with the MIMO radar;
    cancelling a cross-talk portion of the ambient signal with the RF controller during step (D), wherein the cross-talk portion is generated from direct communication between the plurality of transmitters and the plurality of receivers;
    filtering the reflected uplink signal from the ambient signal with the RF controller during step (D);
    dispreading the reflected uplink signal through the PN-code regulator with the RF controller;
    estimating a detection time delay for the spatial positioning data for each target with the RF controller;
    (E) processing communication data from the downlink signal with the MIMO radar;
    (F) detecting a plurality of targets within the reflected uplink signal with the MIMO radar; and
    (G) deriving spatial positioning data for each target from the reflected uplink signal with the MIMO radar.

2. The method as claimed in claim 1 further comprises the steps of:
    providing a pseudo-noise (PN) generator managed by the MIMO radar; and
    encoding the uplink signal through the PN generator with the MIMO radar during step (B), wherein a spread spectrum coding scheme is applied to the uplink signal by the PN generator.

3. The method as claimed in claim 1 comprises:
    providing a RF controller for the MIMO radar;
    receiving an ambient signal with the MIMO radar; and filtering the downlink signal from the ambient signal with the RF controller during step (C).

4. The method as claimed in claim 1 further comprises the steps of:
providing an adaptive noise canceller for the MIMO radar; and
capturing the cross-talk portion of the ambient signal with the adaptive noise canceller.

5. The method as claimed in claim 1 further comprises the steps of:
executing a plurality of iterations for steps (B) through (G);
transmitting an omni-directional uplink signal during step (B) of an initial iteration, wherein the initial iteration is from the plurality of iterations;
receiving a reflected omni-directional uplink signal during step (D) of the initial iteration; and
detecting a plurality of targets during step (F) of the initial iteration.

6. The method as claimed in claim 1 further comprises the steps of:
executing a plurality of iterations for steps (B) through (G);
beamforming a uni-directional uplink signal towards each target detected in a previous iteration during step (B) of an arbitrary iteration, wherein the arbitrary iteration is any iteration from the plurality of iterations, and wherein the previous iteration precedes the arbitrary iteration in the plurality of iterations;
receiving a uni-directional reflected uplink signal for each target detected in the previous iteration during step (D) of the arbitrary iteration; and
detecting a plurality of targets during step (F) of the arbitrary iteration, wherein each target corresponds to the uni-directional reflected uplink signal for each target detected in the previous iteration.

* * * * *